United States Patent
Nara et al.

(10) Patent No.: US 12,297,402 B2
(45) Date of Patent: *May 13, 2025

(54) BASE OIL FOR REFRIGERATOR OIL, REFRIGERATOR OIL, AND WORKING FLUID COMPOSITION FOR REFRIGERATOR

(71) Applicant: ENEOS CORPORATION, Tokyo (JP)

(72) Inventors: Fumiyuki Nara, Tokyo (JP); Tomohiro Takaki, Tokyo (JP); Yuya Mizutani, Tokyo (JP); Makoto Ando, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/290,998

(22) PCT Filed: Jul. 29, 2022

(86) PCT No.: PCT/JP2022/029341
§ 371 (c)(1),
(2) Date: Jan. 22, 2024

(87) PCT Pub. No.: WO2023/008568
PCT Pub. Date: Feb. 2, 2023

(65) Prior Publication Data
US 2024/0247206 A1 Jul. 25, 2024

(30) Foreign Application Priority Data
Jul. 30, 2021 (JP) ................................. 2021-124940

(51) Int. Cl.
| | | |
|---|---|---|
| *C10M 171/00* | (2006.01) | |
| *C09K 5/04* | (2006.01) | |
| *C10M 101/02* | (2006.01) | |
| *C10M 105/04* | (2006.01) | |
| *C10M 137/10* | (2006.01) | |
| *C10M 159/00* | (2006.01) | |
| *C10M 169/04* | (2006.01) | |
| *C10N 20/00* | (2006.01) | |
| *C10N 30/06* | (2006.01) | |
| *C10N 40/30* | (2006.01) | |

(52) U.S. Cl.
CPC ........... *C10M 171/008* (2013.01); *C09K 5/04* (2013.01); *C10M 101/02* (2013.01); *C10M 105/04* (2013.01); *C10M 137/10* (2013.01); *C10M 159/005* (2013.01); *C10M 169/044* (2013.01); *C09K 2205/12* (2013.01); *C10M 2203/003* (2013.01); *C10M 2203/1025* (2013.01); *C10M 2203/1085* (2013.01); *C10M 2205/0285* (2013.01); *C10M 2205/163* (2013.01); *C10M 2223/047* (2013.01); *C10N 2020/017* (2020.05); *C10N 2030/06* (2013.01); *C10N 2040/30* (2013.01)

(58) Field of Classification Search
CPC .......... C10N 2020/017; C10N 2030/06; C10N 2040/30; C09K 5/04; C09K 2205/12; C10M 101/02; C10M 105/04; C10M 169/044; C10M 159/005; C10M 137/10; C10M 171/008; C10M 2205/163; C10M 2205/0285; C10M 2203/1085; C10M 2203/1025; C10M 2223/047; C10M 2203/003

See application file for complete search history.

(56) References Cited

U.S. PATENT DOCUMENTS

| | | | |
|---|---|---|---|
| 2009/0111723 A1* | 4/2009 | Shibata | ................ C10M 101/02 585/16 |
| 2010/0041572 A1 | 2/2010 | Sano et al. | |
| 2010/0093568 A1 | 4/2010 | Tagawa et al. | |
| 2012/0046205 A1 | 2/2012 | Tagawa et al. | |
| 2012/0053094 A1 | 3/2012 | Tagawa et al. | |
| 2012/0053096 A1 | 3/2012 | Tagawa et al. | |
| 2012/0053097 A1 | 3/2012 | Tagawa et al. | |
| 2012/0053102 A1 | 3/2012 | Tagawa et al. | |
| 2012/0053375 A1 | 3/2012 | Tagawa et al. | |
| 2020/0354645 A1 | 11/2020 | Shono et al. | |
| 2021/0032558 A1 | 2/2021 | Shono et al. | |

FOREIGN PATENT DOCUMENTS

| | | |
|---|---|---|
| JP | 2008-013677 A | 1/2008 |
| JP | 2015-071687 A | 4/2015 |
| WO | 2006/062245 A1 | 6/2006 |
| WO | 2007/105452 A1 | 9/2007 |
| WO | 2019/156126 A1 | 8/2019 |
| WO | 2021/100634 A1 | 5/2021 |

OTHER PUBLICATIONS

ISR issued in International WIPO Patent Application No. PCT/JP2022/029341, Oct. 18, 2022, translation.
IPRP issued in International WIPO Patent Application No. PCT/JP2022/029341, Feb. 8, 2024, translation.
EESR issued in EP Patent Application No. 22849628.7, Apr. 5, 2024.

\* cited by examiner

*Primary Examiner* — Vishal V Vasisth
(74) *Attorney, Agent, or Firm* — GREENBLUM & BERNSTEIN, P.L.C.

(57) ABSTRACT

A base oil for a refrigerating machine oil, having cyclic saturates of 40% by mass or less and non-cyclic saturates of 60% by mass or more in saturates, a density at 15° C. of 0.805 g/cm$^3$ or lower, and a normal paraffin content of 50% by mass or less.

5 Claims, No Drawings

BASE OIL FOR REFRIGERATOR OIL, REFRIGERATOR OIL, AND WORKING FLUID COMPOSITION FOR REFRIGERATOR

This application is a 371 of PCT/JP2022/029341 filed Jul. 29, 2022.

TECHNICAL FIELD

The present invention relates to a base oil for a refrigerating machine oil, a refrigerating machine oil, and a working fluid composition for a refrigerating machine.

BACKGROUND ART

In refrigerating machines, it is increasingly desirable to replace refrigerants having a relatively high Global Warming Potential (GWP) with a refrigerant having a low GWP of, for example, less than 150. Examples of the low GWP refrigerant includes carbon dioxide (R744) refrigerants and hydrocarbon refrigerants.

On the other hand, the refrigerating machine is also required to save energy. In general, as the viscosity of the refrigerating machine oil is lower, the stirring resistance and the friction of the sliding portion can be reduced. Therefore, the lowering of the viscosity of the refrigerating machine oil leads to energy saving of the refrigerating machine. For example, Patent Document 1 discloses a refrigerating machine oil of VG3 or more and VG8 or less. Further, for example, Patent Document 2 discloses a refrigerating machine oil containing a mixed base oil composed of a low-viscosity base oil and a high-viscosity base oil.

CITATION LIST

Patent Document

[Patent Document 1] International Publication WO 2006/062245
[Patent Document 2] International Publication WO 2007/105452

SUMMARY OF INVENTION

Technical Problem

However, when the viscosity of the refrigerating machine oil is low, it is difficult to hold the oil film on the sliding portion, and thus, for example, the friction coefficient may increase. On the other hand, when an attempt is made to reduce the friction coefficient, the pour point of the refrigerating machine oil increases, which may be undesirable from the viewpoint of fluidity. Therefore, an object of one aspect of the present invention is to provide a base oil for a refrigerating machine oil and a refrigerating machine oil capable of reducing a friction coefficient and suppressing an increase in a flow point.

Solution to Problem

According to the studies of the present inventors, it has been found that, in a base oil for a refrigerating machine oil, both a reduction in friction coefficient and a suppression of an increase in flow point can be achieved (in other words, an excessive increase in friction coefficient and an excessive increase in flow point can be suppressed) by setting cyclic saturates and non-cyclic saturates in saturates, a density at 15° C., and a normal paraffin content within the specific ranges.

The present invention includes the following aspects.

[1] A base oil for a refrigerating machine oil, having cyclic saturates of 40% by mass or less and non-cyclic saturates of 60% by mass or more in saturates, a density at 15° C. of 0.805 g/cm$^3$ or lower, and a normal paraffin content of 50% by mass or less.

[2] The base oil for a refrigerating machine oil according to [1], wherein a content of a hydrocarbon having 12 to 16 carbon atoms in the base oil is 80% by mass or more.

[3] The base oil for a refrigerating machine oil according to [1] or [2], containing a hydrocarbon base oil having a normal paraffin content of less than 5% by mass.

[4] The base oil for a refrigerating machine oil according to [3], further containing a second hydrocarbon base oil having a normal paraffin content of 5% by mass or more in addition to the hydrocarbon base oil.

[5] The base oil for a refrigerating machine oil according to [3] or [4], wherein the hydrocarbon base oil has an initial boiling point of 140° C. or higher and a 90% distillation temperature of 270° C. or lower.

[6] A refrigerating machine oil containing the base oil for a refrigerating machine oil according to any of [1] to [5].

[7] The refrigerating machine oil according to [6], further containing a phosphorus-containing antiwear agent.

[8] The refrigerating machine oil according to [6] or [7], further containing a polymer additive.

[9] The refrigerating machine oil according to any of [6] to [8], wherein a carbon residue of 10% residual oil of the refrigerating machine oil is 0.02% by mass or more.

[10] The refrigerating machine oil according to any of [6] to [9], wherein a 90% distillation temperature of the refrigerating machine oil is 270° C. or lower.

[11] A working fluid composition for a refrigerating machine, containing: the refrigerating machine oil according to any of [6] to [10]; and a refrigerant.

[12] The working fluid composition for a refrigerating machine according to [11], wherein the refrigerant contains a hydrocarbon.

Advantageous Effects of Invention

According to one aspect of the present invention, it is possible to provide a base oil for a refrigerating machine oil and a refrigerating machine oil capable of reducing a friction coefficient and suppressing an increase in a flow point. In one aspect of the present invention, such an effect can also be obtained when the base oil for a refrigerating machine oil and the refrigerating machine oil have low viscosity.

DESCRIPTION OF EMBODIMENTS

Hereinafter, embodiments of the present invention will be described in detail. One embodiment of the present invention is a base oil for a refrigerating machine oil, which has cyclic saturates of 40% by mass or less and non-cyclic saturates of 60% by mass or more in saturates, a density at 15° C. of 0.805 g/cm$^3$ or lower, and a normal paraffin content of 50% by mass or less.

The content of the cyclic saturates (one-ring to six-ring cycloparaffin (hereinafter also simply referred to as "cycloparaffin")) in the saturates in the base oil may be preferably 30% by mass or less, 20% by mass or less, 10% by mass or less, 5% by mass or less, or 3% by mass or less, and may be 0% by mass or 0% by mass or more, based on the total amount of the saturates in the base oil, from the viewpoint of further reducing the friction coefficient.

The content of the non-cyclic saturates (paraffin (hereinafter also simply referred to as "paraffin")) in the saturates in the base oil may be preferably 70% by mass or more, 80% by mass or more, 90% by mass or more, 95% by mass or more, or 97% by mass or more, and may be 100% by mass or 100% by mass or less, based on the total amount of the saturates in the base oil, from the viewpoint of further reducing the friction coefficient.

The density at 15° C. of the base oil may be preferably 0.802 g/cm³ or lower, 0.800 g/cm³ or lower, 0.790 g/cm³ or lower, or 0.780 g/cm³ or lower, and may be preferably 0.76 g/cm³ or higher, 0.77 g/cm³ or higher, or 0.775 g/cm³ or higher. The density in the present specification means density at 15° C. measured in accordance with the "Oscillating U-tube method" described in JIS K2249-1:2011.

The normal paraffin content of the base oil may be preferably 45% by mass or less, 40% by mass or less, 35% by mass or less, 30% by mass or less, 20% by mass or less, 10% by mass or less, 5% by mass or less, or 2% by mass or less, and may be 0% by mass or 0% by mass or more, based on the total amount of the base oil, from the viewpoint of further suppressing the increase in the pour point.

The content of the hydrocarbon having 12 to 16 carbon atoms in the base oil may be preferably 80% by mass or more, 85% by mass or more, 90% by mass or more, or 95% by mass or more, and may be 100% by mass or 100% by mass or less, based on the total amount of the base oil, from the viewpoint of further reducing the friction coefficient.

The content of the hydrocarbon having 13 to 18 carbon atoms in the base oil may be preferably 80% by mass or more, 85% by mass or more, 90% by mass or more, or 95% by mass or more, and may be 100% by mass or 100% by mass or less, based on the total amount of the base oil, from the viewpoint of further reducing the friction coefficient.

The content of the normal paraffin having 18 or more carbon atoms in the base oil for a refrigerating machine oil may be preferably 10% by mass or less, 5% by mass or less, 2% by mass or less, 1% by mass or less, or 0% by mass, from the viewpoint of low-temperature properties of the refrigerating machine oil.

The pour point of the base oil is preferably −10° C. or lower, more preferably −20° C. or lower, −30° C. or lower, or −40° C. or lower, and may be −80° C. or higher. The pour point in the present specification means pour point measured in accordance with JIS K2269:1987.

The base oil for a refrigerating machine oil, in one embodiment, contains a specific hydrocarbon base oil. Such a hydrocarbon base oil is a hydrocarbon base oil having the cyclic saturates of 30% by mass or less and the non-cyclic saturates of 70% by mass or more in the saturates, and has the density at 15° C. of 0.805 g/cm³ or lower.

The content of the cyclic saturates in the saturates in the hydrocarbon base oil is 30% by mass or less, may be preferably 20% by mass or less, 10% by mass or less, 5% by mass or less, or 3% by mass or less, and may be 0% by mass or 0% by mass or more, based on the total amount of the saturates in the hydrocarbon base oil, from the viewpoint of further reducing the friction coefficient.

The content of the non-cyclic saturates in the saturates in the hydrocarbon base oil is 70% by mass or more, may be preferably 80% by mass or more, 90% by mass or more, 95% by mass or more, or 97% by mass or more, and may be 100% by mass or 100% by mass or less, based on the total amount of the saturates in the hydrocarbon base oil, from the viewpoint of further reducing the friction coefficient.

The density at 15° C. of the hydrocarbon base oil is 0.805 g/cm³ or lower, may be preferably 0.802 g/cm³ or lower, 0.800 g/cm³ or lower, 0.790 g/cm³ or lower, or 0.780 g/cm³ or lower, and may be preferably 0.76 g/cm³ or higher, 0.77 g/cm³ or higher, or 0.775 g/cm³ or higher.

The normal paraffin content of the hydrocarbon base oil may be 50% by mass or less, preferably 40% by mass or less, 35% by mass or less, or 30% by mass or less, more preferably, from the viewpoint of further reducing the friction coefficient, 20% by mass or less, 10% by mass or less, 5% by mass or less, less than 5% by mass, or 2% by mass or less, and may be 0% by mass or 0% by mass or more, based on the total amount of the hydrocarbon base oil.

The content of the aromatic hydrocarbon in the hydrocarbon base oil is not particularly limited, but may be preferably 10% by mass or less, 5% by mass or less, 2% by mass or less, or 1% by mass or less, 0% by mass or 0% by mass or more, from the viewpoint of further reducing the friction coefficient.

The content of the hydrocarbon having 12 to 16 carbon atoms in the hydrocarbon base oil may be preferably 80% by mass or more, 85% by mass or more, 90% by mass or more, or 95% by mass or more, and may be 100% by mass or 100% by mass or less, based on the total amount of the hydrocarbon base oil, from the viewpoint of further reducing the friction coefficient.

The content of the hydrocarbon having 13 to 18 carbon atoms in the hydrocarbon base oil may be preferably 80% by mass or more, 85% by mass or more, 90% by mass or more, or 95% by mass or more, and may be 100% by mass or 100% by mass or less, based on the total amount of the hydrocarbon base oil, from the viewpoint of further reducing the friction coefficient.

The content of the hydrocarbons having less than 12 carbon atoms in the hydrocarbon base oil may be 5% by mass or less, and preferably less than 1% by mass, based on the total amount of the hydrocarbon base oil, from the viewpoint of flash point and the viewpoint of suppressing discharge of volatile organic compounds.

In the present specification, the contents of the cyclic saturates (cycloparaffins), the non-cyclic saturates (paraffins), the normal paraffins, the hydrocarbons having 12 to 16 carbon atoms, the hydrocarbons having 13 to 18 carbon atoms, and the hydrocarbons having less than 12 carbon atoms in the base oil for a refrigerating machine oil and the hydrocarbon base oil are determined by fractionating a sample to be analyzed (hydrocarbon base oil) into a saturated hydrocarbon oil and an aromatic hydrocarbon oil by silica gel chromatography, and subjecting each to hydrocarbon type analysis by GC-TOFMS combined with gas chromatography and mass spectrometry by FI ionisation. Examples of analysis conditions are shown below.

(Gas Chromatography Conditions)
    Column: ZB-1MS manufactured by phenomenex
    Injection temperature: 350° C.
    Temperature rise condition: 50° C. to 350° C. (temperature rise rate: 5° C./min)
    Carrier gas: helium
    Injection method: split sample injection amount: 1 μL (10% toluene Solution)

(Ms Conditions)
    Counter electrode voltage: −10 kV
    Ionization method: FI (field ionization)
    Ion source temperature: room temperature
    Mass number measurement range: m/z 35 to 500

In the mass spectra obtained as a result of GC-TOFMS analysis, the percentage of ion intensity for each type of carbon atoms ($C_nH_{2n+z}$ wherein n is an integer and z is an even number of −18 to 2) can be determined from the percentage of the total ion intensity. In the present specification, the content (% by mass) of each component is calculated assuming that it is substantially the same as the ionic strength % of each component. When the aromatic hydrocarbon content of the sample is less than 1% by mass, the chromatographic fractionation may be omitted and the type analysis may be performed. In this case, the content of each component is calculated assuming that all components are the saturated hydrocarbon components.

The contents of the normal paraffins, the hydrocarbons having 12 to 16 carbon atoms, the hydrocarbons having 13 to 18 carbon atoms, and the hydrocarbons having less than 12 carbon atoms in the hydrocarbon base oil can be obtained by, for example, calculating and totaling peak areas % corresponding to the normal paraffins and the non-normal paraffins for each number of carbon atoms by a hydrocarbon type analysis method by gas chromatography (gas chromatography method) under the following conditions, assuming that the peak areas % are substantially the same as mass %, and then integrating each. This method may be used if equivalent results are obtained. Examples of analysis conditions are shown below.

(Gas Chromatography Conditions)
- Column: liquid-phase non-polar column (length 30 m, internal diameter 0.25 mmφ, liquid-phase thickness 0.1 μm)
- Injection temperature: 350° C.
- Detector: FID 360° C.
- Temperature rise condition: 50° C. to 350° C. (temperature rise rate: 6° C./min)
- Carrier gas: helium
- Injection method: split sample injection amount: 1 μL (10% toluene solution)

The initial boiling point of the hydrocarbon base oil may be 140° C. or higher, and the 90% distillation temperature of the hydrocarbon base oil may be 270° C. or lower. The initial boiling point and 90% distillation temperature of the hydrocarbon base oil and other distillation properties described below mean distillation properties measured by an atmospheric distillation test method (in accordance with the atmospheric method described in JIS K2254:2018).

The 90% distillation temperature (T90) of the hydrocarbon base oil may be preferably 267° C. or lower, 266° C. or lower, 265° C. or lower, 264° C. or lower, 263° C. or lower, 262° C. or lower, or 261° C. or lower, from the viewpoint of further reducing the friction coefficient, and may be, for example, 220° C. or higher, 230° C. or higher, 240° C. or higher, 245° C. or higher, or 250° C. or higher.

The initial boiling point (IBP) of the hydrocarbon base oil may be preferably 140° C. or higher, 170° C. or higher, 190° C. or higher, 200° C. or higher, 210° C. or higher, 220° C. or higher, 230° C. or higher, or 240° C. or higher, and may be 260° C. or lower, 255° C. or lower, or 250° C. or lower, from the viewpoint of further reducing the friction coefficient.

The 10% distillation temperature (T10) of the hydrocarbon base oil may be preferably 200° C. or higher, 210° C. or higher, 220° C. or higher, 230° C. or higher, or 240° C. or higher, and may be 260° C. or lower, 255° C. or lower, or 250° C. or lower, from the viewpoint of further reducing the friction coefficient.

The 50% distillation temperature (T50) of the hydrocarbon base oil may be preferably 210° C. or higher, 220° C. or higher, 230° C. or higher, 240° C. or higher, or 245° C. or higher, and may be 265° C. or lower, 260° C. or lower, 255° C. or lower, or 250° C. or lower, from the viewpoint of further reducing the friction coefficient.

The distillation end point (EP) of the hydrocarbon base oil may be preferably 250° C. or higher and 260° C. or higher, and may be 320° C. or lower, 300° C. or lower, 280° C. or lower, or 270° C. or lower, from the viewpoint of further reducing the friction coefficient.

The difference between the T90 and the T10 (T90−T10) of the hydrocarbon base oil may be preferably 5° C. or higher or 6° C. or higher, and may be 40° C. or lower, 20° C. or lower, 15° C. or lower, or 10° C. or lower, from the viewpoint of further reducing the friction coefficient.

The total distillation amount of the hydrocarbon base oil may be, for example, 95% by volume or more, 96% by volume or more, 97% by volume or more, 98% by volume or more, or 99% by volume or more, and may be 99.9% by volume or less. The residual oil amount of the hydrocarbon base oil may be, for example, 0.10% by volume or more, and may be 6% by volume or less, 4% by volume or less, 3% by volume or less, 2% by volume or less, or 1% by volume or less. The loss amount of the hydrocarbon base oil may be, for example, 1% by volume or less, 0.5% by volume or less, or 0.1% by volume or less, and may be 0% by volume.

The kinematic viscosity at 40° C. of the hydrocarbon base oil may be, for example, 1.0 mm$^2$/s or higher, 1.5 mm$^2$/s or higher, or 2.0 mm$^2$/s or higher, and may be 6.0 mm$^2$/s or lower, 5.0 mm$^2$/s or lower, 4.5 mm$^2$/s or lower, 4.0 mm$^2$/s or lower, 3.5 mm$^2$/s or lower, or 3.0 mm$^2$/s or lower.

The kinematic viscosity in the present specification means kinematic viscosity measured in accordance with JIS K2283:2000.

The kinematic viscosity at 100° C. of the hydrocarbon base oil may be, for example, 0.5 mm$^2$/s or higher, 0.7 mm$^2$/s or higher, or 0.8 mm$^2$/s or higher, and may be 2.0 mm$^2$/s or lower, 1.5 mm$^2$/s or lower, 1.4 mm$^2$/s or lower, 1.3 mm$^2$/s or lower, 1.2 mm$^2$/s or lower, 1.1 mm$^2$/s or lower, or 1.0 mm$^2$/s or lower.

The flash point of the hydrocarbon base oil may be, for example, 70° C. or higher, 80° C. or higher, 100° C. or higher, or 110° C. or higher, and may be 150° C. or lower, 140° C. or lower, or 130° C. or lower. By increasing the initial boiling point of the hydrocarbon base oil, the flash point can be increased and the safeness can be further increased. The flash point in the present specification means flash point measured in accordance with the Cleveland open cup (COC) method described in JIS K2265-4:2007.

The distillation properties, the kinematic viscosities, and the flash point of the hydrocarbon base oil described above can be read as the distillation properties, the kinematic viscosities, and the flash point of the base oil for a refrigerating machine oil, respectively.

The pour point of the hydrocarbon base oil may be, for example, −10° C. or lower, −20° C. or lower, −30° C. or lower, or −40° C. or lower, and may be −80° C. or higher.

Examples of the hydrocarbon base oil having the above-described properties include a mineral hydrocarbon base oil, a synthetic hydrocarbon base oil, and a mixed base oil thereof. Examples of the mineral hydrocarbon base oil include a paraffinic or naphthenic refined mineral oil obtained by refining crude oil or distillation residual oil thereof as a raw material by appropriately combining ordinary petroleum refining treatments (solvent deasphalting, solvent extraction, hydrocracking, solvent dewaxing, catalytic dewaxing, hydrorefining, sulfuric acid washing, clay treatment, distillation, and the like).

Examples of the synthetic hydrocarbon base oil include a poly α-olefin or a hydride thereof, an isoparaffin, an alkylbenzene, and an alkylnaphthalene. These hydrocarbon base oils may be used alone or in combination of two or more.

The hydrocarbon base oil is preferably a mineral hydrocarbon base oil from the viewpoint of easily obtaining the above-described properties. More specifically, the hydrocarbon base oil having the above-described properties can be easily obtained by hydrorefining a light and gas oil fraction obtained by atmospheric distillation of crude oil, or a cracked gas oil fraction obtained by cracking a residual oil feedstock containing atmospheric residual oil of crude oil or its vacuum residual oil, and fractionating so that hydrocarbons having the above-described distillation properties, particularly 12 to 16 carbon atoms or 13 to 18 carbon atoms, become the main component (for example, 80% by mass or more, particularly 90% by mass or more).

The hydrocarbon base oil is more preferably an isoparaffinic base oil from the viewpoint of easily obtaining the above-described properties. The isoparaffinic base oil may be, for example, an isoparaffinic base oil obtained by appropriately combining hydrocracking, hydroisomerization, hydrodewaxing, hydrorefining, distillation, and the like to purify normal-paraffin-containing components obtained by a dewaxing step in a petroleum refining process, Fischer-Tropsch synthesis, or the like, or polymers of olefins such as ethylene, propylene, butylenes, and diisobutylene.

The base oil for a refrigerating machine oil may contain a hydrocarbon base oil (hereinafter also referred to as "hydrocarbon base oil A") having the above-described properties as a main component. The base oil for a refrigerating machine oil may contain only the hydrocarbon base oil A, or may further contain an additional base oil in addition to the hydrocarbon base oil A. The content of the hydrocarbon base oil A may be 50% by mass or more, 70% by mass or more, 90% by mass or more, or 95% by mass or more, based on the total amount of the base oil for a refrigerating machine oil. The content of the hydrocarbon base oil A may be 50% by mass or more, 70% by mass or more, 90% by mass or more, or 95% by mass or more, based on the total amount of the refrigerating machine oil.

In one embodiment, when the base oil for a refrigerating machine oil contains a hydrocarbon base oil (first hydrocarbon base oil) having the paraffin content of less than 5% by mass as the hydrocarbon base oil A, the base oil for a refrigerating machine oil may further contain a second hydrocarbon base oil having the normal paraffin content of 5% by mass or more in addition to the first hydrocarbon base oil. As a result, a synergistic low friction effect due to the combined use of the first hydrocarbon base oil and the second hydrocarbon base oil can be obtained. In this case, the normal paraffin content of the first hydrocarbon base oil of the base may be 2% by mass or less, 0% by mass or 0% by mass or more, and the normal paraffin content of the second hydrocarbon base oil may be 10% by mass or more, 20% by mass or more, 30% by mass or more, 50% by mass or more, 80% by mass or more, or 90% by mass or more.

The second hydrocarbon base oil is more preferably a hydrocarbon base oil satisfying the ranges of properties (distillation properties, hydrocarbons having 12 to 16 carbon atoms, hydrocarbons having 13 to 18 carbon atoms, kinematic viscosities (40° C., 100° C.), flash point, density, and aromatic content) described above for the hydrocarbon base oil A from the viewpoint of keeping the pour point low and reducing the friction coefficient.

When the second hydrocarbon base oil is used, the content of the second hydrocarbon base oil is preferably 50% by mass or less, 40% by mass or less, or 35% by mass or less, may be 0% by mass or 0% by mass or more, and may be 10% by mass or more, 15% by mass or more, 20% by mass or more, or 25% by mass or more, based on the total amount of base oil for a refrigerating machine oil. In another embodiment, the content of the second hydrocarbon base oil may be 30% by mass or less, 25% by mass or less, 20% by mass or less, or 15% by mass or less.

Another embodiment of the present invention is a refrigerating machine oil containing the base oil for a refrigerating machine oil described above. The refrigerating machine oil may contain the base oil for a refrigerating machine as a main component. The content of the base oil for a refrigerating machine oil may be 50% by mass or more, 70% by mass or more, 90% by mass or more, or 95% by mass or more, based on the total amount of the refrigerating machine oil.

The refrigerating machine oil may contain the hydrocarbon base oil A, may contain the first hydrocarbon base oil and the second hydrocarbon base oil, may contain a hydrocarbon base oil (third hydrocarbon base oil) other than the first hydrocarbon base oil A, and the second hydrocarbon base oil, and may contain an oxygen-containing base oil.

As the third hydrocarbon base oil, for example, a mineral hydrocarbon oil, a synthetic hydrocarbon oil, or a mixture thereof can be used. Examples of the mineral hydrocarbon oil include a paraffinic mineral oil and a naphthenic mineral oil obtained by refining a lubricating oil fraction obtained by atmospheric distillation or vacuum distillation of a paraffinic or naphthenic crude oil by a method such as solvent deasphalting, solvent refining, hydrorefining, hydrocracking, solvent dewaxing, hydrodewaxing, clay treatment, or sulfuric acid washing. These purification methods may be used alone or in combination of two or more thereof.

As the mineral hydrocarbon oil, a residual hydrocarbon base oil can also be preferably used. Examples of the residual hydrocarbon base oil include a residual hydrocarbon base material such as atmospheric distillation residual oil of crude oil, vacuum distillation residual oil of the atmospheric distillation residual oil, deasphalted oil of these residual oils by propane or the like, solvent-extracted extract oil of deasphalted oil by furfural or the like, solvent-extracted raffinate oil of deasphalted oil, and refined oils obtained by subjecting these oils to refining treatment such as hydrocracking, hydrorefining, solvent dewaxing or hydrodewaxing.

Among them, the refined oil obtained by hydrorefining the solvent-extracted raffinate of deasphalted oil of a vacuum distillation residual oil, followed by solvent dewaxing or hydrodewaxing is particularly preferable.

Examples of the synthetic hydrocarbon oil include an alkylbenzenes, an alkylnaphthalenes, a poly α-olefin (PAO), a polybutene, and an ethylene-α-olefin copolymer.

The kinematic viscosity at 40° C. of the third hydrocarbon base oil may be, for example, 6 mm$^2$/s or higher, and from the viewpoint of more effectively reducing the friction coefficient, may be 20 mm$^2$/s or higher, 50 mm$^2$/s or higher, 80 mm$^2$/s or higher, or 90 mm$^2$/s or higher. The upper limit of the kinematic viscosity at 40° C. of the third hydrocarbon base oil is not particularly limited, but may be, for example, 1000 mm$^2$/s or lower, and is preferably 500 mm$^2$/s or lower.

The kinematic viscosity at 40° C. of the residual hydrocarbon base oil may be, for example, 100 mm$^2$/s or higher, 200 mm$^2$/s or higher, 300 mm$^2$/s or higher, 400 mm$^2$/s or higher, or 450 mm$^2$/s or higher, and 1000 mm$^2$/s or lower, 800 mm$^2$/s or lower, 600 mm$^2$/s or lower, or 500 mm$^2$/s or lower.

The kinematic viscosity at 100° C. of the residual hydrocarbon base oil may be, for example, 10 mm$^2$/s or higher, 20 mm²/s or higher, or 30 mm²/s or higher, and may be 100 mm²/s or lower, 50 mm²/s or lower, or 40 mm²/s or lower.

The viscosity index of the residual hydrocarbon base oil may be, for example, 0 or higher, 50 or higher, or 80 or higher, and may be 300 or lower, 140 or lower, or 100 or lower. The viscosity index in the present specification means viscosity index measured in accordance with JIS K2283: 2000.

The flash point of the residual hydrocarbon base oil may be, for example, 200° C. or higher, 250° C. or higher, or 300° C. or higher, and may be 500° C. or lower, 450° C. or lower, or 400° C. or lower.

The carbon residue of the residual hydrocarbon base oil is not particularly limited, but may be preferably 0.1% by mass or more, 0.2% by mass or more, or 0.3% by mass or more, and may be preferably 10% by mass or less, 5% by mass or less, 1% by mass or less, or 0.8% by mass or less, from the viewpoint of further improving antiwear property.

The ASTM color of the residual hydrocarbon base oil may be 6.0 or less, 4.0 or less, or 3.0 or less, may be L0. 5, and may be 0.5 or more, or 1.0 or more, from the viewpoint of hue of the refrigerating machine oil.

When the third hydrocarbon base oil is used, the content of the third hydrocarbon base oil may be 0.5% by mass or more, 1% by mass or more, 2% by mass or more, or 3% by mass or more, and may be 50% by mass or less, 30% by mass or less, 10% by mass or less, or 5% by mass or less, based on the total amount of the base oil contained in the refrigerating machine oil.

Examples of the oxygen-containing base oil include an ester, an ether, a carbonate, a ketone, a silicone, and a polysiloxane. The term "ester" as used herein does not include the polymers described later.

Examples of the ester include a monoester, a polyol ester, an aromatic ester, a dibasic acid ester, a complex ester, and a mixture thereof.

Among these, it is preferable to use a monoester of a monohydroxylic aliphatic alcohol and a monocarboxylic fatty acid, and it is desirable to use a mixture of the monoester and a polyol ester of a di- to hexa-hydroxylic alcohol and a monocarboxylic fatty acid, as necessary.

Examples of the monohydroxylic aliphatic alcohol constituting such an ester include a monohydroxylic aliphatic alcohol having 1 to 20 carbon atoms, preferably 4 to 18 carbon atoms, and more preferably 4 to 12 carbon atoms. Examples of the monocarboxylic fatty acid constituting such an ester include a monocarboxylic fatty acid having 1 to 20 carbon atoms, preferably 4 to 18 carbon atoms, and more preferably 4 to 12 carbon atoms. Preferred examples of the di- to hexa-hydroxylic alcohol constituting such an ester include neopentyl glycol, trimethylolpropane, pentaerythritol, and dipentaerythritol. Examples of the ether include a polyvinyl ether, a polyalkylene glycol, a polyphenyl ether, a perfluoroether, and a mixture thereof.

The refrigerating machine oil preferably further contains an antiwear agent as an additive from the viewpoint of improving the antiwear property. Examples of the antiwear agent include a phosphorus-containing antiwear agent. Examples of the phosphorus-containing antiwear agent include a phosphoric acid ester, a thiophosphoric acid ester, an acidic phosphoric acid ester, an amine salt of an acidic phosphoric acid ester, and a chlorinated phosphoric acid ester.

The antiwear agent (preferably phosphorus-containing antiwear agent) may be used alone or in combination of two or more. The phosphorus-containing antiwear agent is preferably one or two or more selected from the phosphoric acid ester and the thiophosphoric acid ester.

Examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, tri(ethylphenyl) phosphate, tri(butylphenyl) phosphate, trixylenyl phosphate, cresyl diphenyl phosphate, and xylenyl diphenyl phosphate. The phosphoric acid ester is preferably triphenyl phosphate or tricresyl phosphate.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate and xylenyl diphenyl phosphorothionate. The thiophosphate ester is preferably triphenylphosphorothionate.

The content of the antiwear agent (preferably phosphorus-containing antiwear agent) may be, for example, 0.1% by mass or more, 0.5% by mass or more, or 1% by mass or more, and may be 5% by mass or more, 4% by mass or less, or 3% by mass or less, based on the total amount of the refrigerating machine oil.

The refrigerating machine oil may further contain a polymer additive. The polymer additive may contain, for example, a polymer ingredient having a kinematic viscosity at 40° C. higher than that of the base oil for a refrigerating machine oil, and may contain a polymer containing an unsaturated carboxylic acid ester as a monomer unit. The polymer is obtained by polymerizing one or two or more monomers containing an unsaturated carboxylic acid ester that is an ester of an unsaturated carboxylic acid and an alcohol.

The polymer is not particularly limited as long as it contains the unsaturated carboxylic acid ester, and may further contain an additional monomer (a monomer copolymerizable with an unsaturated carboxylic acid ester). That is, the polymer may be a homopolymer of one of the unsaturated carboxylic acid ester, a copolymer of two or more of the unsaturated carboxylic acid esters, or a copolymer of one or two or more of the unsaturated carboxylic acid esters and one or two or more of the additional monomers.

The unsaturated carboxylic acid constituting the unsaturated carboxylic acid ester has at least one polymerizable unsaturated bond (polymerizable carbon-carbon double bond) and at least one carboxyl group, and may be, for example, an unsaturated monocarboxylic acid having one polymerizable unsaturated bond and one carboxyl group, or an unsaturated dicarboxylic acid having one polymerizable unsaturated bond and two carboxyl groups. Examples of the unsaturated monocarboxylic acid include acrylic acid, methacrylic acid (hereinafter collectively referred to as "(meth) acrylic acid"), and crotonic acid.

Examples of the unsaturated dicarboxylic acid include maleic acid, fumaric acid, citraconic acid, mesaconic acid, and itaconic acid.

The alcohol constituting the unsaturated carboxylic acid ester may be, for example, an alcohol having 1 to 40 carbon atoms, preferably contains an alcohol having 1 to 18 carbon atoms, and more preferably contains an alcohol having 1 to 8 carbon atoms. These alcohols may be linear or branched. The alcohol may contain an alcohol having 1 to 18 carbon atoms and an alcohol having 20 to 40 carbon atoms. These alcohols may be aliphatic alcohols.

The alcohol may be a monohydric alcohol or a polyhydric alcohol. Examples of such alcohols include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, and octadecanol (these may be linear or branched).

The alcohol preferably contains at least one selected from a linear aliphatic monohydric alcohol having 1 to 18 carbon atoms and a branched aliphatic monohydric alcohol having 4 to 40 carbon atoms. In other words, the unsaturated carboxylic acid ester preferably has at least one alkyl group selected from a linear alkyl group having 1 to 18 carbon atoms and a branched alkyl group having 4 to 40 carbon atoms.

When the unsaturated carboxylic acid ester is a (meth) acrylic acid ester, the (meth)acrylic acid ester preferably contains at least one selected from a (meth)acrylic acid ester having a linear alkyl group having 1 to 18 carbon atoms, and more preferably contains at least one selected from a (meth) acrylic acid ester having a linear alkyl group having 1 to 18 carbon atoms, and at least one selected from a (meth)acrylic acid ester having a 2-position branched alkyl group having 4 or more and less than 20 carbon atoms or having 20 or more and 40 or less carbon atoms.

The 2-position branched alkyl group having 4 or more and less than 20 carbon atoms is an alkyl group represented by the following formula (1):

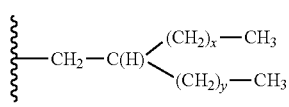

(1)

wherein x and y are each independently an integer of 0 or more and an integer such that x+y is less than 16.

The 2-position branched alkyl group having 20 or more and 40 or less carbon atoms has x and y that are each independently an integer of 0 or more, and an integer such that x+y is 16 or more and 36 or less, in the formula (1). In particular, x is preferably an integer of 5 to 18, and y is preferably an integer of 3 to 18.

In the case where the unsaturated carboxylic acid ester is an unsaturated dicarboxylic acid ester, the unsaturated dicarboxylic acid ester preferably contains at least one selected from unsaturated dicarboxylic acid esters having a linear alkyl group having 4 to 10 carbon atoms.

The monomer other than the unsaturated carboxylic acid ester is not particularly limited, and examples thereof include unsaturated carboxylic acids or anhydrides thereof exemplified as the unsaturated carboxylic acid constituting the unsaturated carboxylic acid ester described above, unsaturated hydrocarbon compounds having a polymerizable unsaturated bond, and the like. The unsaturated hydrocarbon may be, for example, an unsaturated hydrocarbon compound having 2 to 20 carbon atoms, and may be preferably an α-olefin having 2 to 20 carbon atoms or styrene. Specific examples of the α-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. The α-olefin is preferably an α-olefin having 8 to 12 carbon atoms.

The polymer is preferably a copolymer of the unsaturated carboxylic acid esters (two or more unsaturated carboxylic acid esters) or a copolymer of the unsaturated carboxylic acid carboxylic acid ester (one or more unsaturated carboxylic acid esters) and the α-olefin (one or more α-olefins). The copolymer of the unsaturated carboxylic acid ester is preferably a copolymer of the (meth)acrylic acid esters. The copolymer of the unsaturated carboxylic acid ester and the α-olefin is preferably at least one selected from the group consisting of a copolymer of the (meth)acrylic acid ester and the α-olefin, and a copolymer of the unsaturated dicarboxylic acid ester and the α-olefin, and more preferably a copolymer of the unsaturated dicarboxylic acid ester and the α-olefin.

Preferred examples of the unsaturated dicarboxylic acid ester in the copolymer of the unsaturated dicarboxylic acid ester and the α-olefin include monoesters or diesters of unsaturated dicarboxylic acids such as maleic acid, fumaric acid, citraconic acid, mesaconic acid, and itaconic acid with aliphatic alcohols having 3 to 10 carbon atoms such as propanol, butanol, pentanol, hexanol, heptanol, octanol, nonanol, and decanol.

The aliphatic alcohol having 3 to 10 carbon atoms is preferably a linear aliphatic alcohol having 4 to 10 carbon atoms. The unsaturated dicarboxylic acid ester is preferably a maleic acid ester. Preferred examples of the maleic acid ester include dimethyl maleate, diethyl maleate, dipropyl maleate, dibutyl maleate, dipentyl maleate, dihexyl maleate, diheptyl maleate, dioctyl maleate and didecyl maleate.

When the polymer is a copolymer, the content of the unsaturated carboxylic acid ester may be 10% by mole or more, 30% by mole or more, or 50% by mole or more, and may be 90% by mole or less, 70% by mole or less, or 50% by mole or less, based on the total amount of monomer units constituting the copolymer.

When the polymer is a copolymer of the unsaturated carboxylic acid ester and the α-olefin, the molar ratio of unsaturated carboxylic acid ester/α-olefin is not particularly limited, but may be preferably 1/9 or more, more preferably 3/7 or more, and is preferably 9/1, more preferably 7/3 or less.

The number average molecular weight (Mn) of the polymer is preferably 300 or more, more preferably 1000 or more, and even more preferably 1500 or more, and may be 2000 or more, 3000 or more, or 4000 or more, and is preferably 500000 or less, more preferably 50000 or less, and even more preferably 30000 or less, and may be 20000 or less, 15000 or less, or 10000 or less.

The weight average molecular weight (Mw) of the polymer is preferably 400 or more, more preferably 1000 or more, even more preferably 2000 or more, and particularly preferably 3000 or more, and may be 4000 or more, 5000 or more, 6000 or more, 7000 or more, 8000 or more, or 9000 or more, and is preferably 10000000 or less, more preferably 100000 or less, even more preferably 50000 or less, and particularly preferably 30000 or less, and may be 20000 or less.

The Mw/Mn of the polymer is preferably 1.2 or more, more preferably 1.5 or more, even more preferably 1.7 or more, and particularly preferably 2 or more, and is preferably 5 or less, more preferably 3.5 or less, and even more preferably 3 or less, and may be 2.5 or less.

In the present specification, "weight average molecular weight (Mw)" and "number average molecular weight (Mn)" respectively mean weight average molecular weight and number average molecular weight in terms of polystyrene determined by gel permeation chromatography (GPC) (standard substance: polystyrene) using an APC XT column manufactured by Waters Corporation as a column and tetrahydrofuran as a mobile phase.

The kinematic viscosity at 100° C. of the polymer is preferably 10 mm$^2$/s or higher, more preferably 20 mm$^2$/s or higher, even more preferably 100 mm$^2$/s or higher, and is preferably 100000 mm$^2$/s or lower or 10000 mm$^2$/s or lower, more preferably 1000 mm$^2$/s or lower, even more preferably 800 mm$^2$/s or lower, and may be 500 mm$^2$/s or lower.

The kinematic viscosity at 40° C. of the polymer is preferably 100 mm$^2$/s or higher, more preferably 200 mm$^2$/s or higher, and even more preferably 400 mm$^2$/s or higher than 400 mm$^2$/s, and may be 500 mm$^2$/s or 1000 mm$^2$/s or higher, and is preferably 100000 mm$^2$/s or lower, more preferably 20000 mm$^2$/s or lower, and even more preferably 15000 mm$^2$/s or lower, and may be 10000 mm$^2$/s or lower or 5000 mm$^2$/s or lower.

The viscosity index of the polymer is preferably 80 or higher, more preferably 140 or higher, and may be 180 or higher or 200 or higher, and is preferably 400 or lower, more preferably 300 or lower, and may be 250 or lower. The viscosity index in the present specification means a viscosity index measured in accordance with JIS K2283:2000.

The polymer preferably has a residual carbon content in a specific range when evaporated and thermally decomposed. Although the reason for this is unclear, it is presumed that the presence of a precursor (polymer precursor) corresponding to the residual carbon content can further reduce the friction coefficient in a specific slip speed region. The residual carbon content of the polymer is, for example, 0.2% by mass or more, preferably 0.5% by mass or more, more preferably 1% by mass or more, and even more preferably 1.5% by mass or more, and may be 2% by mass or more or 2.5% by mass or more, and is preferably 10% by mass or less, more preferably 5% by mass or less, and even more preferably 4% by mass or less, and may be 3.5% by mass or less. The residual carbon content in the present specification means a residual carbon content measured by a micro method in accordance with JIS K2270-2:2009.

The polymer additive may further contain an additional components other than the polymer such as a diluent oil, in order to improve handling properties during synthesis, transportation, and the like, in addition to the polymer. The characteristics of the polymer described above (number average molecular weight (Mn), weight average molecular weight (Mw), Mw/Mn, kinematic viscosity at 100° C., kinematic viscosity at 40° C., viscosity index, and residual carbon content) can also be read as characteristics of a polymer additive in a state of being added to a refrigerating machine oil. However, when the polymer additive contains the additional component other than the polymer, the number average molecular weight (Mn) and the weight average molecular weight (Mw) of the polymer additive mean values measured excluding the additional component.

In calculating the average molecular weight of the polymer in the polymer additive or the refrigerating machine oil containing the polymer additive, the average molecular weight of the polymer may be calculated by the gel permeation chromatography described above using a sample obtained by fractionating and removing components belonging to the other components from the polymer additive or the refrigerating machine oil containing the polymer additive by rubber membrane dialysis or the like.

More specific examples of the polymer (polymer additive) described above include polymers described in Examples described later, and other examples include the following polymers (polymer additives).

Polymer additive A: a copolymer of (meth)acrylic esters (kinematic viscosity at 100° C.: 600 mm$^2$/s, the polymer has Mn: 25000, Mw/Mn: 1.4, and residual carbon content: 1.1% by mass)

Polymer additive B: a copolymer of (meth)acrylic esters (kinematic viscosity at 100° C.: 370 mm$^2$/s, the polymer has Mn: 25900, Mw/Mn: 1.3, and residual carbon content: 1.1% by mass)

Polymer additive C: a copolymer of (meth)acrylic esters (kinematic viscosity at 100° C.: 180 mm$^2$/s, the polymer has Mn of: 3620, Mw/Mn: 2.0, and residual carbon content: 1.3% by mass)

Polymer additive D: a copolymer of (meth)acrylic esters (kinematic viscosity at 100° C.: 360 mm$^2$/s, the polymer has Mn: 11000, Mw/Mn: 1.6, and residual carbon content: 0.9% by mass)

Polymer additive E: a copolymer of (meth)acrylic esters (kinematic viscosity at 100° C.: 380 mm$^2$/s, the polymer has Mn: 22500, Mw/Mn: 1.5, and residual carbon content: 0.1% by mass)

Polymer additive F: a copolymer of a maleic acid ester and an $\alpha$-olefin (kinematic viscosity at 40° C.: 1980 mm$^2$/s, kinematic viscosity at 100° C.: 200 mm$^2$/s, viscosity index: 227, the polymer has Mn: 4500, Mw/Mn: 2.2, and residual carbon content: 3.1% by mass)

Polymer additive G: a copolymer of a maleic acid ester and an $\alpha$-olefin (kinematic viscosity at 40° C.: 4100 mm$^2$/s, kinematic viscosity at 100° C.: 260 mm$^2$/s, viscosity index: 190, the polymer has Mn: 1800, Mw/Mn: 2.7, and residual carbon content: 2.8% by mass)

Polymer additive H: a copolymer of a maleic acid ester and an $\alpha$-olefin (kinematic viscosity at 40° C.: 4300 mm$^2$/s, kinematic viscosity at 100° C.: 300 mm$^2$/s, viscosity index: 225, the polymer has Mn: 2000, Mw/Mn: 2.5, and residual carbon content: 1.7% by mass)

Polymer additive I: a copolymer of a maleic acid ester and an $\alpha$-olefin (kinematic viscosity at 40° C.: 7000 mm$^2$/s, kinematic viscosity at 100° C.: 500 mm$^2$/s, viscosity index: 230, the polymer has Mn: 2650, Mw/Mn: 4.0, and residual carbon content: 2% by mass)

Polymer additive J: a copolymer of a maleic acid ester and an $\alpha$-olefin (kinematic viscosity at 40° C.: 11000 mm$^2$/s, kinematic viscosity at 100° C.: 700 mm$^2$/s, viscosity index: 250, the polymer has Mn: 2690, Mw/Mn: 3.1, and residual carbon content: 1.5% by mass)

Polymer additive K: a copolymer of a maleic acid ester and an $\alpha$-olefin (kinematic viscosity at 40° C.: 400 mm$^2$/s, kinematic viscosity at 100° C.: 40 mm$^2$/s, viscosity index: 160, and residual carbon content: 0.8% by mass)

Polymer additive L: a copolymer of methacrylic acid alkyl esters (the methacrylic acid alkyl esters contain, as main components, methacrylic acid alkyl esters having a linear alkyl group having 1, 12 to 16, or 18 carbon atoms and methacrylic acid alkyl esters having a 2-position branched alkyl group having 6, 8, or 10 or more and less than 20 carbon atoms, the copolymer has Mn: 9300, Mw: 16000, and Mw/Mn: 1.7)

The polymer additive M: a copolymer of a maleic acid dialkyl ester and an α-olefin having 8 to 10 carbon atoms (the maleic acid dialkyl ester contains a maleic acid dialkyl ester having a linear alkyl group having 4 or 8 to 10 carbon atoms as a main component, the copolymer has Mn: 8300, Mw: 12800, and Mw/Mn: 1.5)

Polymer additive N: a copolymer of methacrylic acid alkyl esters and an α-olefin having 10 carbon atoms (the methacrylic acid alkyl esters contain, as main components, methacrylic acid alkyl esters having a linear alkyl group having 12 to 15 carbon atoms and methacrylic acid alkyl esters having a 2-position branched alkyl group having 6, 8, 10 or more and less than 20 carbon atoms, the copolymer has Mn: 6900, Mw: 9900, and Mw/Mn: 1.4)

Polymer additive O: a copolymer containing, as monomer units, methyl methacrylate, n-dodecyl methacrylate, n-tridecyl methacrylate, n-tetradecyl methacrylate, n-hexadecyl methacrylate, n-octadecyl methacrylate and 2-decyl-tetradecyl (x=11, y=9) methacrylate (Mn=10500, Mw=18000, Mw/Mn=1.7)

The content of the polymer is preferably 0.1% by mass or more, more preferably 0.5% by mass or more, and even more preferably 0.8% by mass or more, from the viewpoint of further improving the friction characteristics of the refrigerating machine oil, and may be preferably 50% by mass or less, more preferably 2% by mass or less, still more preferably less than 2% by mass, particularly preferably 1% by mass or less, and may be less than 1% by mass, from the viewpoint of suppressing the viscosity at 100° C. of the refrigerating machine oil and achieving a lower friction coefficient even in a region where the sliding speed is relatively high, based on the total amount of the refrigerating machine oil The refrigerating machine oil according to the present embodiment may further contain an additional additive in addition to the above-described components. Examples of the additive include an antioxidant, an acid scavenger, a phosphorus-free extreme pressure agent, a metal deactivator, an anti-wear agent, a pour point depressant, a detergent dispersant and a defoaming agent. The content of these additives may be 10% by mass or less, or 5% by mass or less, based on the total amount of the refrigerating machine oil, unless otherwise specified below.

Examples of the antioxidant include phenol-based antioxidants and amine-based antioxidants. Examples of the phenol-based antioxidant include 2,6-di-tert.-butyl-p-cresol (DBPC), 2,6-di-tert.-butyl-phenol, and 4,4'-methylenebis (2,6-di-tert.-butyl-phenol). Examples of the amine-based antioxidant include phenyl-α-naphthylamines and dialkylated diphenylamines. These antioxidants may be used alone or in combination of two or more thereof. The content of the antioxidant is, for example, 0.01 to 5% by mass, preferably 0.1 to 3% by mass, based on the total amount of the refrigerating machine oil.

Examples of the acid scavenger include an epoxy compound (epoxy-based acid scavenger). Examples of the epoxy compound include glycidyl ether type epoxy compounds, glycidyl ester type epoxy compounds, aryloxirane compounds, alkyloxirane compounds, alicyclic epoxy compounds, epoxidized fatty acid monoesters, and epoxidized vegetable oils. These acid scavengers may be used alone or in combination of two or more thereof. The content of the acid scavenger is, for example, 0.01 to 5% by mass and preferably 0.1 to 3% by mass, based on the total amount of the refrigerating machine oil.

The kinematic viscosity at 40° C. of the refrigerating machine oil may be, for example, 10 mm$^2$/s or lower, is preferably 6 mm$^2$/s or lower, more preferably 5 mm$^2$/s or lower, and still more preferably 4 mm$^2$/s or lower, and may be 3.5 mm$^2$/s or lower, or y 3.0 mm$^2$/s or lower. The lower limit of the kinematic viscosity at 40° C. of the refrigerating machine oil is not particularly limited, and may be, for example, 1 mm$^2$/s or higher or 2 mm$^2$/s or higher. The kinematic viscosity at 100° C. of the refrigerating machine oil may be preferably 0.5 mm$^2$/s or higher, more preferably 0.8 mm$^2$/s or higher, and still more preferably 1 mm$^2$/s or higher. The kinematic viscosity at 100° C. of the refrigerating machine oil may be preferably 10 mm$^2$/s or lower, more preferably 5 mm$^2$/s or lower, still more preferably 3 mm$^2$/s or lower, and particularly preferably 2 mm$^2$/s or lower.

The viscosity index of the refrigerating machine oil may be −50 or higher, preferably 0 or higher, more preferably 50 or higher, and may be 200 or lower.

The pour point of the refrigerating machine oil is preferably −10° C. or lower, and may be more preferably −20° C. or lower, −45° C. or lower, −40° C. or lower, or −45° C. or lower.

The volume resistivity of the refrigerating machine oil may be preferably $1.0 \times 10^9$ Ω·m or higher, more preferably $1.0 \times 10^{10}$ Ω·m or higher, and still more preferably $1.0 \times 10^{11}$ Ω·m or higher. The volume resistivity in the present specification mean volume resistivity at 25° C. measured in accordance with JIS C2101:1999.

The moisture content of the refrigerating machine oil may be preferably 200 ppm or less, more preferably 100 ppm or less, and still more preferably 50 ppm or less, based on the total amount of the refrigerating machine oil. The moisture content in the present specification means a moisture content measured in accordance with JIS K2275-2 or 3 (Karl Fischer volumetric titration method or coulometric titration method).

The density of the refrigerating machine oil at 15° C. may be, for example, 0.75 g/cm$^3$ or higher, 0.76 g/cm$^3$ or higher, or 0.77 g/cm$^3$ or higher, and may be 0.85 g/cm$^3$ or lower, 0.83 g/cm$^3$ or lower, 0.81 g/cm$^3$ or lower, 0.80 g/cm$^3$ or lower, or 0.79 g/cm$^3$ or lower.

The flash point of the refrigerating machine oil may be, for example, 70° C. or higher, 80° C. or higher, 90° C. or higher, 100° C. or higher, or 110° C. or higher, and may be 150° C. or lower, 140° C. or lower, or 130° C. or lower.

The acid value of the refrigerating machine oil may be preferably 1.0 mgKOH/g or lower, more preferably 0.1 mgKOH/g or lower. The hydroxyl value of the refrigerating machine oil is, for example, 10 mgKOH/g or lower, preferably 5 mgKOH/g or lower, and more preferably 2 mgKOH/g or lower. The acid value in the present specification means an acid value measured in accordance with JIS K2501:2003. The hydroxyl value in the present specification means a hydroxyl value measured in accordance with JIS K0070:1992.

The initial boiling point (IBP) of the refrigerating machine oil may be preferably 140° C. or higher, 170° C. or higher, 190° C. or higher, 200° C. or higher, 210° C. or higher, 220° C. or higher, 230° C. or higher, or 240° C. or higher, and may be 260° C. or lower, 255° C. or lower, or 250° C. or lower, from the viewpoint of further reducing the friction coefficient.

The 10% distillation temperature (T10) of the refrigerating machine oil may be preferably 200° C. or higher, 210° C. or higher, 220° C. or higher, 230° C. or higher, or 240° C. or higher, and may be 260° C. or lower, 255° C. or lower, or 250° C. or lower, from the viewpoint of further reducing the friction coefficient.

The 50% distillation temperature (T50) of the refrigerating machine oil may be preferably 210° C. or higher, 220° C. or higher, 230° C. or higher, 240° C. or higher, or 245° C. or higher, and may be 265° C. or lower, 260° C. or lower, 255° C. or lower, or 250° C. or lower, from the viewpoint of further reducing the friction coefficient.

The 90% distillation temperature (T90) of the refrigerating machine oil may be preferably 220° C. or higher, 230° C. or higher, 240° C. or higher, 245° C. or higher, or 250° C. or higher, and may be 270° C. or lower, 267° C. or lower, 266° C. or lower, 265° C. or lower, 264° C. or lower, 263° C. or lower, 262° C. or lower, or 261° C. or lower, from the viewpoint of further reducing the friction coefficient.

The distillation end point (EP) of the refrigerating machine oil may be preferably 250° C. or higher, 260° C. or higher, 270° C. or higher, 275° C. or higher, or 280° C. or higher, and may be 320° C. or lower, 310° C. or lower, 300° C. or lower, 295° C. or lower, or 290° C. or lower, from the viewpoint of further reducing the friction coefficient.

The difference between the T90 and the T10 (T90–T10) of the refrigerating machine oil may be preferably 5° C. or higher, 6° C. or higher, 7° C. or higher, 8° C. or higher, 9° C. or higher, or 10° C. or higher, and may be 40° C. or lower, 30° C. or lower, 20° C. or lower, or 15° C. or lower, from the viewpoint of further reducing the friction coefficient.

The total distillation amount of the refrigerating machine oil may be, for example, 90% by volume or more, 93% by volume or more, or 95% by volume or more, and may be 99% by volume or less. The residual oil amount of the refrigerating machine oil may be, for example, 1% by volume or more, and may be 10% by volume or less, 7% by volume or less, or 5% by volume or less. The loss amount of the refrigerating machine oil may be, for example, 1% by volume or less, 0.5% by volume or less, or 0.1% by volume or less, and may be 0% by volume.

The ash content of the refrigerating machine oil may be preferably 100 ppm or less, and more preferably 50 ppm or less. The ash content in the present specification means an ash content measured in accordance with JIS K2272:1998.

The carbon residue of the 10% residual oil of the refrigerating machine oil may be 0.01% by mass or less, but from the viewpoint of further reducing the friction coefficient, may be preferably 0.01% by mass or more, 0.02% by mass or more, 0.05% by mass or more, 0.1% by mass or more, 0.2% by mass or more, or 0.21% by mass or more, and for example, 0.6% by mass or less, 0.5% by mass or less, or 0.4% by mass or less. The carbon residue in the present specification means carbon residue measured by the micro method in accordance with JIS K2270-2:2009. In the present specification, the carbon residue of 10% residual oil means carbon residue measured by the same method for residual oil obtained by distilling the refrigerating machine oil and removing the distillate oil having a volume fraction of up to 90%.

The refrigerating machine oil according to the present embodiment may be mixed with a refrigerant and present in a state of a working fluid composition for a refrigerating machine in a refrigerating machine containing a refrigerant circulation system containing a compressor, a condenser, an expansion mechanism, and an evaporator.

The refrigerating machine oil lubricates, for example, a sliding member in the compressor. That is, another embodiment of the present invention is a working fluid composition for a refrigerating machine, containing the refrigerating machine oil and a refrigerant. The content of the refrigerating machine oil in the working fluid composition for a refrigerating machine may be 1 part by mass or more or 2 parts by mass or more, and may be 500 parts by mass or less or 400 parts by mass or less, with respect to 100 parts by mass of the refrigerant.

Examples of the refrigerant include a hydrocarbon, a saturated hydrofluorocarbon, an unsaturated hydrofluorocarbon, a fluorine-containing ether such as a perfluoroether, bis(trifluoromethyl) sulfide, trifluoroiodomethane, ammonia and carbon dioxide.

The refrigerant preferably contains a hydrocarbon. The content of the hydrocarbon may be 50% by mass or more, 60% by mass or more, 70% by mass or more, 80% by mass or more, 90% by mass or more, 95% by mass or more, based on the total amount of the refrigerant.

The hydrocarbon is preferably a hydrocarbon having 1 to 5 carbon atoms, and more preferably a hydrocarbon having 2 to 4 carbon atoms.

Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. Among these, the hydrocarbon is preferably a hydrocarbon that is gaseous at 25° C. and 1 atm, and more preferably propane, normal butane, isobutane, 2-methylbutane, or a mixture thereof.

Examples of the saturated hydrofluorocarbon include a saturated hydrofluorocarbon having preferably 1 to 3 carbon atoms, and more preferably 1 to 2 carbon atoms. The unsaturated hydrofluorocarbon (HFO) is preferably an unsaturated hydrofluorocarbon having 2 to 4 carbon atoms and 1 to 5 fluorine atoms, more preferably a fluoropropene, and still more preferably a fluoropropene having 3 to 5 fluorine atoms.

EXAMPLES

Hereinafter, the present invention will be described in more detail based on examples, but the present invention is not limited to the following examples.

Base oils (hydrocarbon base oils) used in Examples 1 to 4 are as follows. Since the aromatic content of these hydrocarbon base oils was less than 1% by mass, chromatographic fractionation was not performed, and the hydrocarbon type analysis by the above-described GC-TOFMS method or the hydrocarbon type analysis by the above-described gas chromatography method was directly performed by regarding all as saturated hydrocarbons. The properties of these hydrocarbon base oils are shown in Table 1.

Base oil (hydrocarbon base oil) 1: isoparaffinic base oil obtained by hydro-cracking/isomerizing/purifying paraffin components synthesized from carbon monoxide and hydrogen by a Fischer-Tropsch reaction and then fractionating (aromatic content <0.5% by mass, ASTM color: 0) Base oil (hydrocarbon base oil) 2: normal paraffinic hydrocarbon oil obtained by adsorbing with a molecular sieve from a kerosene fraction that is hydrodesulfurization product of atmospheric distillation distillate of a crude oil and then fractionating (aromatic content <0.5% by mass, ASTM color: 0) Base oil (hydrocarbon base oil) 3: mineral hydrocarbon oil obtained by hydrorefining hydrocracked gas oil of raw material containing vacuum distillation residual oil and then fractionating (aromatic content <0.5% by mass, ASTM color: 0) Base oil (hydrocarbon base oil) 4: mineral hydrocarbon oil obtained by hydrorefining hydrocracked gas oil of raw material containing vacuum distillation residual oil and then fractionating (aromatic content <0.5% by mass, ASTM color: 0)

TABLE 1

| | | | Base oil 1 | Base oil 2 | Base oil 3 | Base oil 4 |
|---|---|---|---|---|---|---|
| Distillation properties JIS K2254 (atmospheric method) | Initial boiling point | °C. | 240.0 | 245.0 | 242.0 | 242.0 |
| | T10 | | 243.5 | 249.0 | 246.0 | 246.0 |
| | T50 | | 245.5 | 250.0 | 249.0 | 248.0 |
| | T90 | | 250.0 | 253.5 | 253.0 | 251.5 |
| | End point | | 265.0 | 263.5 | 282.0 | 260.0 |
| | T90 − T10 | | 6.5 | 4.5 | 7.0 | 5.5 |
| | Total distillation amount | | 99.0 | 98.0 | 99.0 | 98.5 |
| | Residual oil amount | % by volume | 1.0 | 2.0 | 1.0 | 1.5 |
| | Loss amount | | 0 | 0 | 0 | 0 |
| Kinematic viscosity | 40° C. | mm²/s | 2.15 | 2.17 | 2.44 | 2.46 |
| | 100° C. | | 0.96 | 1.0 | 1.1 | 1.0 |
| Density | 15° C. | g/cm³ | 0.773 | 0.768 | 0.827 | 0.826 |
| Flash point | COC | °C. | 120 | N.A. | 116 | 116 |
| Flash point | PM | °C. | 109 | 118 | N.A. | N.A. |
| Pour point | | °C. | <−45 | 5 | <−45 | <−45 |
| C12-C16 components | | % by mass | 100 | 99.5 | 98.1 | 98.1 |
| C13-C18 components | | | 100 | 99.9 | 98.1 | 98.5 |
| Aromatic components | | | <0.5 | <0.5 | <0.5 | <0.5 |
| Cyclic saturates | | | 0 | 0 | 55 | 78.3 |
| Non-cyclic saturates | | | 100 | 100 | 45 | 21.7 |
| n-paraffin content | | | 0 | 99.1 | 1.2 | 1.4 |

In addition, the following base oils 5-12 were prepared using the base oils 1, 2 and 4 described above.

Base oil 5: mixture of base oil 1/base oil 2 (mass ratio 80/20)

Base oil 6: mixture of base oil 1/base oil 2 (mass ratio 70/30)

Base oil 7: mixture of base oil 1/base oil 2 (mass ratio 55/45)

Base oil 8: mixture of base oil 1/base oil 2 (mass ratio 45/55)

Base oil 9: mixture of base oil 1/base oil 4 (mass ratio 80/20)

Base oil 10: mixture of base oil 1/base oil 4 (mass ratio 65/35)

Base oil 11: mixture of base oil 1/base oil 4 (mass ratio 50/50)

Base oil 12: mixture of base oil 1/base oil 4 (mass ratio 30/70)

Using each of the above base oils 1-12, 97.3% by mass of each the base oils was mixed with 1.7% by mass of the phosphorus-containing antiwear agent and 1.0% by mass of the polymer additive (both based on the total amount of the refrigerating machine oil), which are shown below to prepare each refrigerating machine oil of Examples and Comparative Examples. The properties of each base oil are shown in Tables 2 and 3. The 90% distillation temperature (T90) of each of these refrigerating machine oils was lower than 267° C. The carbon residue of 10% residual oil of each of these refrigerating machine oils was 0.3% by mass. The specific gravities at 15° C. of the refrigerating machine oils of Examples 1 to 7 and the base oils used therein were 0.8017 g/cm³ or lower, and in this respect, both corresponded to "gasoline" defined in Article 2, paragraph 1 of the Japanese Gasoline Tax Act.

Phosphorus-containing antiwear agent: mixture of tricresyl phosphate and triphenyl phosphorothionate Polymer additive: copolymer of maleic acid dialkyl esters and α-olefins having 8 to 10 carbon atoms (the maleic acid dialkyl esters contain, as main components, maleic acid dialkyl esters having a linear alkyl group having 4 and 8 to 10 carbon atoms, and the copolymer has Mn: 8300, Mw: 12800, and Mw/Mn: 1.5)

(Evaluation of Friction Characteristics)

In order to evaluate the friction characteristics of each of the refrigerating machine oils of Examples and Comparative Examples, the following tests were performed.

Using an MTM (Mini Traction Machine) tester (manufactured by PCS Instruments), the friction coefficient (p) in the lubrication region corresponding to the elastic fluid lubrication region or the mixed lubrication region was measured under the following conditions. The results are shown in Tables 2 and 3. The smaller the friction coefficient is, the more excellent the friction characteristics are.

Ball and disc: standard test piece (AISI 52100 standard)
Test temperature: 40° C.
Sliding speed: 0.3 to 0.9 m/s (partially extracted)
Load: 10N
Slip ratio: 30%

The value of $|U_D - U_B|$ [m/s] was used as the sliding speed, wherein $U_D$ is the speed [m/s] of the disk in the sliding part and $U_B$ is the speed [m/s] of the ball in the sliding part.

TABLE 2

| | | | Example 1 Base oil 1 | Comparative Example 1 Base oil 2 | Comparative Example 2 Base oil 3 | Comparative Example 3 Base oil 4 | Example 2 Base oil 5 | Example 3 Base oil 6 |
|---|---|---|---|---|---|---|---|---|
| | Type of base oil | | | | | | | |
| Properties of base oil | Density | g/cm³ | 0.773 | 0.768 | 0.827 | 0.826 | 0.772 | 0.772 |
| | Cyclic saturates | % by mass | 0 | 0 | 55.0 | 78.3 | 0 | 0 |
| | Non-cyclic saturates | | 100 | 100 | 45 | 21.7 | 100 | 100 |

TABLE 2-continued

| | Type of base oil | | Example 1 Base oil 1 | Comparative Example 1 Base oil 2 | Comparative Example 2 Base oil 3 | Comparative Example 3 Base oil 4 | Example 2 Base oil 5 | Example 3 Base oil 6 |
|---|---|---|---|---|---|---|---|---|
| | n-paraffin content | | 0 | 99.1 | 1.2 | 1.4 | 19.8 | 29.7 |
| | C12-C16 components | | 100 | 99.5 | 98.1 | 98.1 | 99.90 | 99.85 |
| | C13-C18 components | | 100 | 99.9 | 98.1 | 98.5 | 99.98 | 99.97 |
| | Pour point | ° C. | <−45 | 5 | <−45 | <−45 | −27.5 | −17.5 |
| Friction | Sliding speed | | | | | | | |
| characteristics | 0.9 | m/s | 0.0067 | 0.0213 | 0.0150 | 0.0166 | 0.0058 | 0.0060 |
| | 0.75 | | 0.0064 | 0.0216 | 0.0150 | 0.0160 | 0.0057 | 0.0054 |
| | 0.6 | | 0.0065 | 0.0222 | 0.0160 | 0.0168 | 0.0055 | 0.0055 |
| | 0.45 | | 0.0067 | 0.0228 | 0.0160 | 0.0181 | 0.0059 | 0.0064 |
| | 0.3 | | 0.0077 | 0.0239 | 0.0190 | 0.0217 | 0.0064 | 0.0087 |

TABLE 3

| | Type of base oil | | Example 4 Base oil 7 | Comparative Example 4 Base oil 8 | Example 5 Base oil 9 | Example 6 Base oil 10 | Example 7 Base oil 11 | Comparative Example 5 Base oil 12 |
|---|---|---|---|---|---|---|---|---|
| Properties of base oil | Density | g/cm$^3$ | 0.771 | 0.770 | 0.784 | 0.792 | 0.800 | 0.810 |
| | Cyclic saturates | % by mass | 0 | 0 | 15.6 | 27.3 | 39 | 54.6 |
| | Non-cyclic saturates | | 100 | 100 | 84.3 | 72.6 | 60.9 | 45.2 |
| | n-paraffin content | | 44.6 | 54.5 | 0.3 | 0.5 | 0.7 | 1.0 |
| | C12-C16 components | | 99.78 | 99.73 | 99.62 | 99.34 | 99.05 | 98.67 |
| | C13-C18 components | | 99.96 | 99.95 | 99.70 | 99.48 | 99.25 | 98.95 |
| | Pour point | ° C. | −10 | −2.5 | <−45 | <−45 | <−45 | <−45 |
| Friction | Sliding speed | | | | | | | |
| characteristics | 0.9 | m/s | 0.0054 | 0.0053 | 0.0090 | 0.0103 | 0.0111 | 0.0131 |
| | 0.75 | | 0.0051 | 0.0048 | 0.0083 | 0.0093 | 0.0105 | 0.0126 |
| | 0.6 | | 0.0055 | 0.0050 | 0.0087 | 0.0098 | 0.0109 | 0.0131 |
| | 0.45 | | 0.0066 | 0.0059 | 0.0097 | 0.0110 | 0.0120 | 0.0148 |
| | 0.3 | | 0.0089 | 0.0084 | 0.0126 | 0.0140 | 0.0151 | 0.0183 |

As described above, Examples, which use using base oils having the cyclic saturates of 40% by mass or less and the non-cyclic saturates of 60% by mass or more in the saturates, the density at 15° C. of 0.805 g/cm$^3$ or lower, and the normal paraffin content of 50% by mass or less, could reduce the friction coefficient and suppress increase in the pour point (the pour point became −10° C. or lower). In contrast, in Comparative Examples using base oils that do not satisfy the above-described properties, the friction coefficient was excessively increased and the pour point was excessively increased (the pour point was higher than −10° C.).

(Low-Temperature Precipitation Test in Presence of Refrigerant)

The refrigerating machine oil of Example 1 was subjected to a low-temperature precipitation test according to Appendix A of JIS K2211 (2009) using R600a, which is a hydrocarbon refrigerant, as the refrigerant. The mixed fluid of R600a and the refrigerating machine oil did not exhibit any hair-like precipitate, granular precipitate, cloudiness or cloudiness, which means the low-temperature precipitation tendency was not observed, when the refrigerating machine oil/the refrigerant ratio (mass ratio) was in a range of 1/99 to 99/1, and the mixed fluid was cooled to −40° C.

The invention claimed is:

1. A refrigerating machine oil comprising:
   a base oil for a refrigerating machine oil, having cyclic saturates of 40% by mass or less and non-cyclic saturates of 60% by mass or more in saturates, a density at 15° C. of 0.76 g/cm$^3$ or higher and 0.802 g/cm$^3$ or lower, a content of a hydrocarbon having 12 to 16 carbon atoms of 85% by mass or more, and a normal paraffin content of 45% by mass or less, and
   a phosphorus-containing antiwear agent,
   wherein a 90% distillation temperature of the refrigerating machine oil is 270° C. or lower, and wherein the refrigerating machine oil is used together with a refrigerant.

2. The refrigerating machine oil according to claim 1, further comprising a polymer additive.

3. The refrigerating machine oil according to claim 1, wherein a carbon residue of 10% residual oil of the refrigerating machine oil is 0.02% by mass or more measured by the micro method in accordance with JIS K2270-2:2009.

4. A working fluid composition for a refrigerating machine, comprising:
   a refrigerating machine oil comprising a base oil for a refrigerating machine oil, having cyclic saturates of 40% by mass or less and non-cyclic saturates of 60% by mass or more in saturates, a density at 15° C. of 0.76 g/cm³ or higher and 0.802 g/cm³ or lower, a content of a hydrocarbon having 12 to 16 carbon atoms of 85% by mass or more, and a normal paraffin content of 45% by mass or less, and a refrigerant, wherein a 90% distillation temperature of the refrigerating machine oil is 270° C. or lower.

5. The working fluid composition for a refrigerating machine according to claim 4, wherein the refrigerant comprises a hydrocarbon.

* * * * *